United States Patent
Hsu

(10) Patent No.: US 7,533,449 B2
(45) Date of Patent: May 19, 2009

(54) HINGE TO IMPROVE PANEL STABILITY

(75) Inventor: Jia-Hao Hsu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 250 days.

(21) Appl. No.: 11/582,056

(22) Filed: Oct. 16, 2006

(65) Prior Publication Data

US 2008/0098568 A1 May 1, 2008

(51) Int. Cl.
*E05D 3/10* (2006.01)

(52) U.S. Cl. .............. 16/367; 16/366; 16/376; 16/343

(58) Field of Classification Search ............ 16/367, 16/366, 376, 343, 282, 302; 455/575.3; 379/433.11, 379/433.13; 361/680, 681, 682, 683
See application file for complete search history.

(56) References Cited

U.S. PATENT DOCUMENTS

| | | | |
|---|---|---|---|
| 6,256,837 B1 * | 7/2001 | Lan et al. ............ | 16/367 |
| 6,804,861 B2 * | 10/2004 | Hsu ............ | 16/366 |
| 6,845,546 B1 * | 1/2005 | Lu et al. ............ | 16/367 |
| 7,055,218 B2 * | 6/2006 | Lu et al. ............ | 16/367 |
| 7,146,195 B2 * | 12/2006 | Sudo et al. ............ | 379/433.13 |
| 7,234,204 B2 * | 6/2007 | Liu et al. ............ | 16/367 |
| 7,319,749 B2 * | 1/2008 | Lu et al. ............ | 379/433.13 |
| 7,346,960 B2 * | 3/2008 | Higano et al. ............ | 16/367 |
| 2004/0107540 A1 * | 6/2004 | Hsu ............ | 16/366 |
| 2005/0005399 A1 * | 1/2005 | Lu et al. ............ | 16/367 |
| 2005/0283949 A1 * | 12/2005 | Lu et al. ............ | 16/367 |
| 2006/0021195 A1 * | 2/2006 | Yamada et al. ............ | 16/367 |
| 2006/0023411 A1 * | 2/2006 | Ryu et al. ............ | 361/683 |
| 2007/0174997 A1 * | 8/2007 | Lu et al. ............ | 16/367 |

* cited by examiner

*Primary Examiner*—Victor Batson
*Assistant Examiner*—Jeffrey O'Brien
(74) *Attorney, Agent, or Firm*—William E. Pelton, Esq.; Cooper & Dunham LLP

(57) ABSTRACT

A hinge to improve panel stability has a central bracket, a tilt hinge assembly and a rotating hinge assembly. The central bracket has two ribs. The tilt hinge assembly connects to the central bracket and connects to a base of an electronic device. The rotating hinge assembly connects to the central bracket, connects to a panel of the electronic device and has a flange abutting against the ribs of the central bracket to keep the panel steady when the panel rotates relative to the base via the rotating hinge assembly.

9 Claims, 8 Drawing Sheets

HINGE TO IMPROVE PANEL STABILITY

BACKGROUND OF THE INVENTION

1. Field of the Invention

The present invention relates to a hinge, especially to a hinge mounted between a panel and a base of an electronic device to improve panel stability.

2. Description of the Prior Arts

Electrical appliances such as notebook computers, cell phones, etc. have a panel, a base and a conventional hinge. The conventional hinge connects the panel to the base along a transverse axis and a longitudinal axis to allow the panel to pivot relative to the base. When the conventional hinge pivots along the transverse axis, the panel is opened or closed relative to the base. When the conventional hinge pivots along the longitudinal axis, the panel is turned left or right relative to the base. The conventional hinge comprises a stationary leaf, a rotating leaf and a contact surface. The stationary leaf connects to the base. The rotating leaf connects to the panel to allow the panel to turn left or right relative to the base. However, the contact surface between the stationary leaf and the rotating leaf is not flat. When the panel is turned left or right relative to the base, the non-flat contact surface between the panel and base easily causes the panel to shake.

To overcome the shortcomings, the present invention provides a hinge to improve panel stability to mitigate or obviate the aforementioned problems.

SUMMARY OF THE INVENTION

The main objective of the present invention is to provide a hinge to improve panel stability. The hinge to improve panel stability has a central bracket, a tilt hinge assembly and a rotating hinge assembly. The central bracket has two ribs. The tilt hinge assembly connects to the central bracket and connects to a base of an electronic device. The rotating hinge assembly connects to the central bracket, connects to a panel of the electronic device and has a flange abutting against the ribs of the central bracket to keep the panel steady when the panel rotates relative to the base via the rotating hinge assembly.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
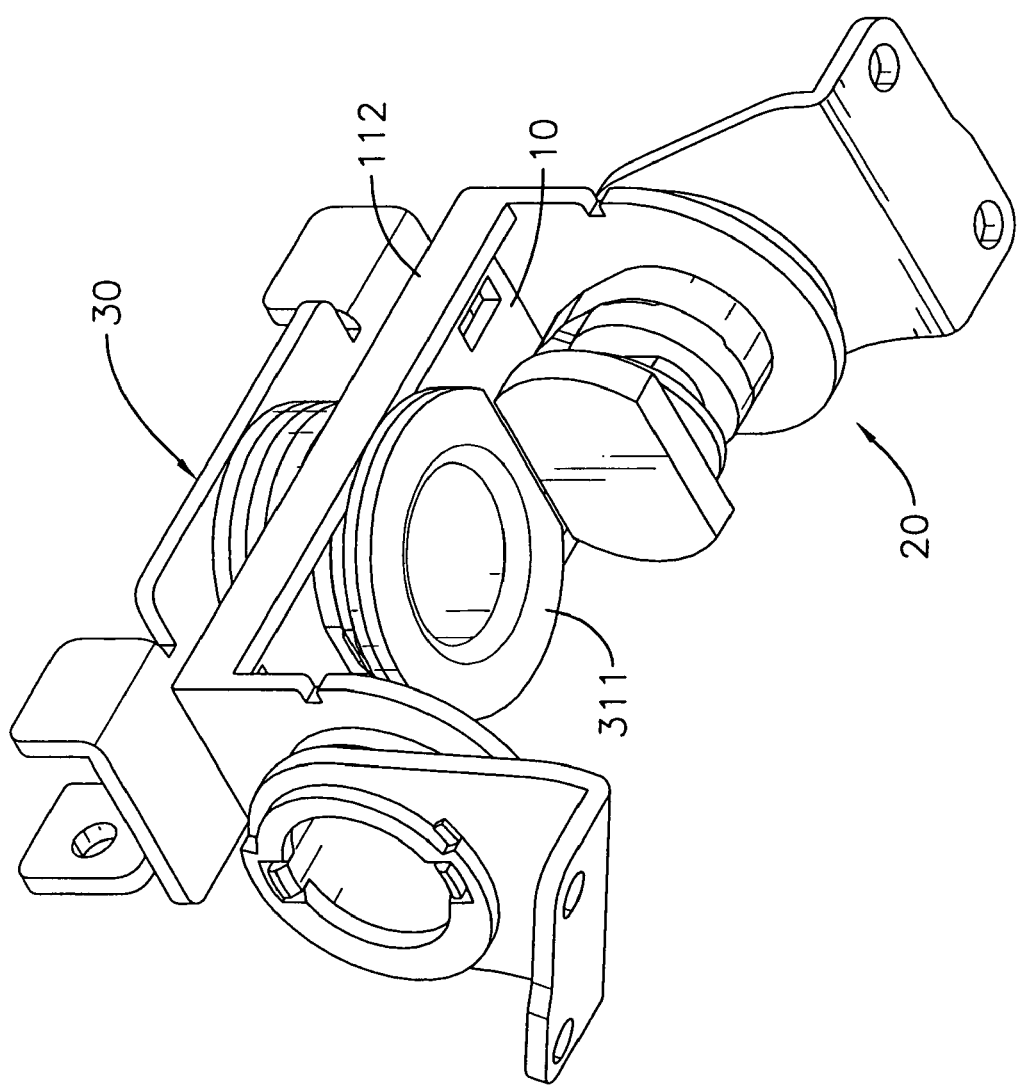
FIG. 1 is a perspective view of a hinge to improve panel stability in accordance with the present invention.
Figure 2:
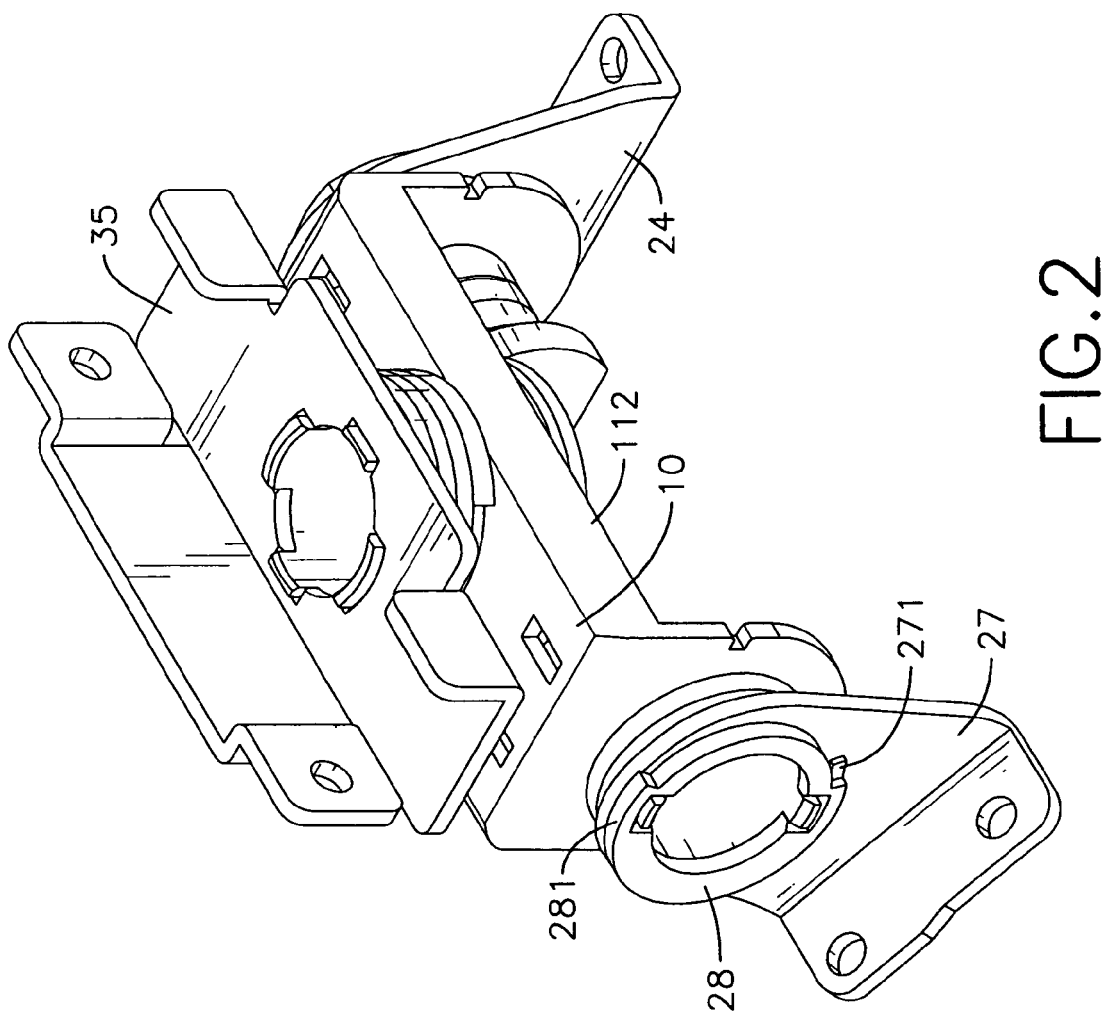
FIG. 2 is another perspective view of the hinge in FIG. 1.
Figure 3:
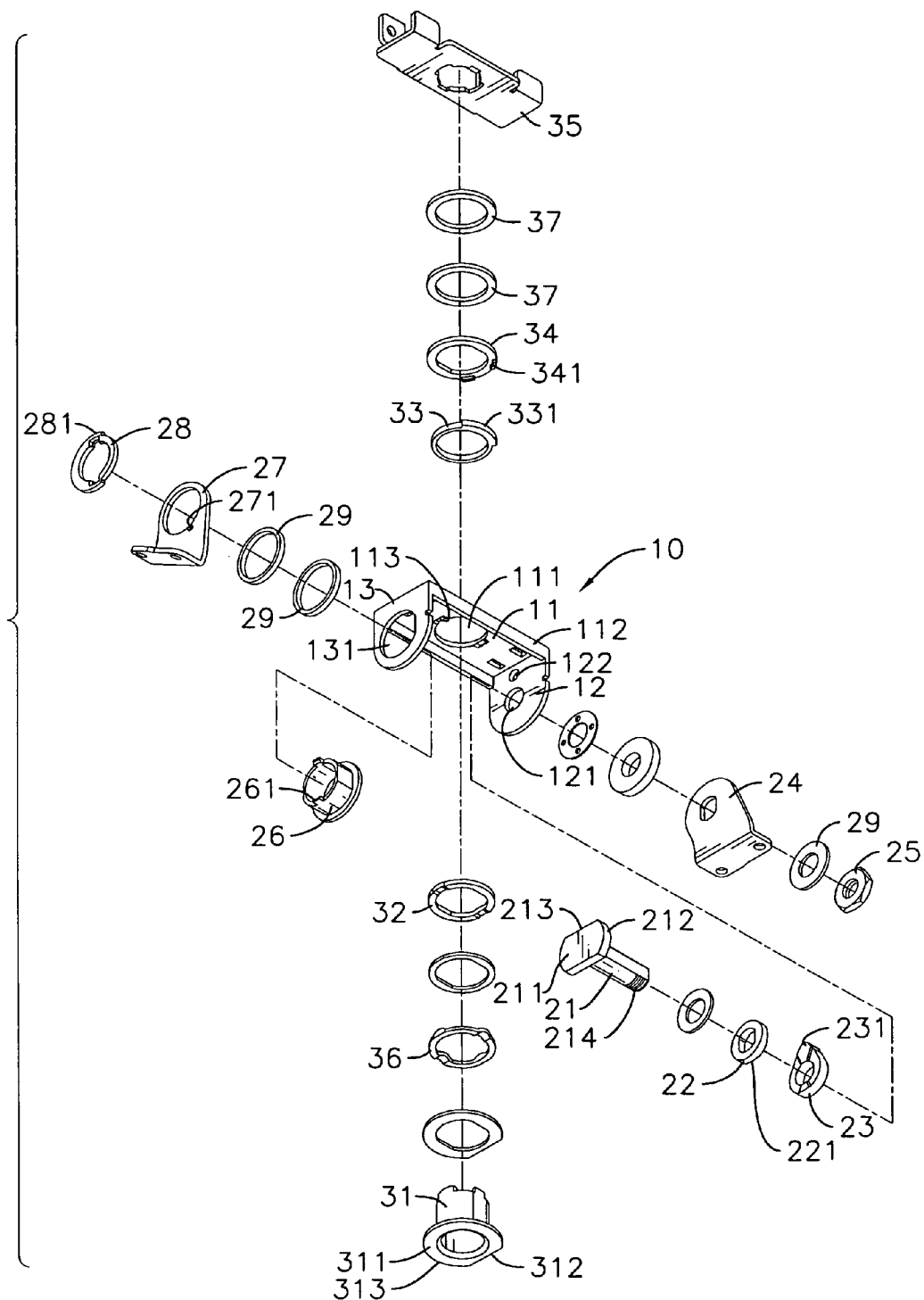
FIG. 3 is an exploded perspective view of the hinge in FIG. 1.
Figure 4:
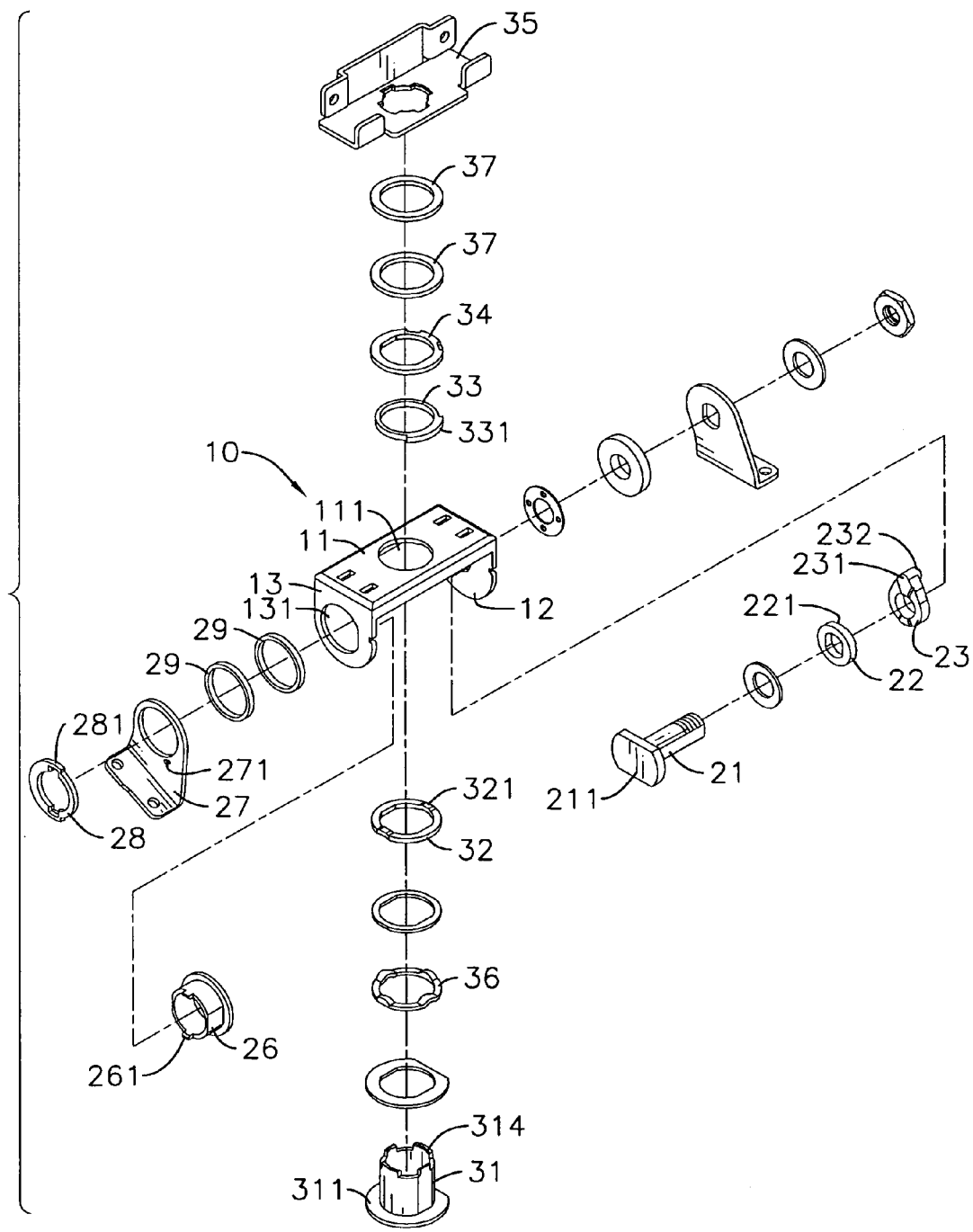
FIG. 4 is another exploded perspective view of the hinge in FIG. 1.

With reference to FIGS. 1 to 4, a hinge to improve panel stability in accordance with the present invention comprises a central bracket (10), a tilt hinge assembly (20) and a rotating hinge assembly (30).

The central bracket (10) is U-shaped and has a base (11), a first arm (12) and a second arm (13).

The base (11) has a first end, a second end, two sides, an outer surface, an inner surface, a central hole (111), two ribs (112) and at least one positioning detent (113). The ribs (112) are respectively and perpendicularly formed on the two sides of the base (11) toward the inner surface. The at least one positioning detent (113) is formed in the inner surface of the base (11) around the central hole (111).

The first arm (12) is formed perpendicularly on the first end of the base (11) toward the inner surface of the base (11) and has an outer surface, an inner surface, a central hole (121) and a fastening hole (122). The fastening hole (122) is formed through the first arm (12).

The second arm (13) is formed perpendicularly on the second end of the base (11) toward the inner surface of the base (11) and has an outer surface, an inner surface and a central hole (131).

The tilt hinge assembly (20) connects to the first and second arms (12, 13) of the central bracket (10) and comprises a limiting shaft (21), a rotating positioning element (22), a stationary positioning element (23), a connecting bracket (24), a fastener (25), a stationary rod (26), a limiting bracket (27), a limiting element (28) and multiple washers (29).

The limiting shaft (21) extends through the first arm (12) and has an inner end, an outer end (214) and a limiting head (211). The outer end (214) abuts the outer surface of the first aim (12) and may be a threaded end. The limiting head (211) is formed transversely on the inner end of the limiting shaft (21), abuts the inner surface of the first arm (12) and has two limiting sides (212) and two flat sides (213). The limiting sides (212) are opposite to each other. The flat sides (213) are opposite to each other. The distance between the limiting sides (212) is longer than the distance between the flat sides (213).

The rotating positioning element (22) is mounted securely on the limiting shaft (21), is mounted between the limiting head (211) of the limiting shaft (21) and the inner surface of the first arm (12) and has a contacting surface and at least one positioning detent (221). The contacting surface of the rotating positioning element (22) faces to the inner surface of the first arm (12). The at least one positioning detent (221) is formed in the contacting surface of the rotating positioning element (22).

The stationary positioning element (23) is mounted around the limiting shaft (21), is mounted securely on the first arm (12), is mounted adjacent to the rotating positioning element (22) and has a contacting surface, a fastening surface, at least one positioning protrusion (231) and a fastening protrusion (232). The contacting surface of the stationary positioning element (23) faces to the contacting surface of the rotating positioning element (22). The fastening surface of the stationary positioning element (23) faces to the inner surface of the first arm (12). The at least one positioning protrusion (231) is formed on and extends out of the contacting surface and corresponds to and selectively engages the at least one positioning detent (221) in the rotating positioning element (22). The fastening protrusion (232) is formed on and extends out of the fastening surface of the stationary positioning element (23) and extends through the fastening hole (122) in the first arm (12).

The connecting bracket (24) is mounted securely on the limiting shaft (21) between the outer end (214) of the limiting shaft (21) and the outer surface of the first arm (12).

The fastener (25) is mounted securely on the outer end (214) of the limiting shaft (21) and may be a nut screwed on the outer end (214) of the limiting shaft (21).

The stationary rod (26) is mounted securely in and extends through the second arm (13) of the central bracket (10) and has an inner end, an outer end and multiple fastening protrusions (261). The fastening protrusions (261) are formed axially on the outer end of the stationary rod (26).

The limiting bracket (27) is mounted rotatably on the outer end of the stationary rod (26) and has an outer surface and a stop (271). The stop (271) is formed on the outer surface of the limiting bracket (27).

The limiting element (28) is mounted securely on the outer end of the stationary rod (26), engages the fastening protrusions (261) on the stationary rod (26) and has an edge and an arc limit (281). The arc limit (281) is formed radially on the edge of the limiting element (28) and selectively abuts against the stop (271) on the limiting bracket (27).

The washers (29) are mounted around the limiting shaft (21) and the stationary rod (26) to reduce the friction.

The rotating hinge assembly (30) connects to the base (11) of the central bracket (10) and comprises a rotating rod (31), a rotating positioning element (32), a stationary limiting element (33), a rotating limiting element (34), a fastening bracket (35), a resilient element (36) and multiple washers (37).

The rotating rod (31) is mounted rotatably and extends through the base (11) of the central bracket (10) and has a bottom end, a top end, a flange (311) and multiple fastening protrusions (314). The flange (311) is formed radially on the bottom end of the rotating rod (31), corresponds to the limiting head (211) of the limiting shaft (21) and has a center, a flat side (312) and an arc side (313) adjacent to the flat side (312). The distance between the center and the flat side (312) is shorter than the distance between the center and the arc side (131). The flat side (312) of the flange (311) of the rotating rod (31) alternatively aligns with the limiting side (212) or the flat side (213) of the limiting head (211) of the limiting shaft (21). The arc side (313) of the flange (311) of the rotating rod (31) abuts against the ribs (112) on the base (11) of the central bracket (10) and alternatively aligns with the limiting side (212) or the flat side (213) of the limiting head (211) of the limiting shaft (21). The fastening protrusions (314) are formed axially on the top end of the rotating rod (31).

The rotating positioning element (32) is mounted securely on the rotating rod (31), abuts against the inner surface of the base (11) and has a top surface and at least one positioning protrusion (321). The at least one positioning protrusion (321) is formed on the top surface of the rotating positioning element (32) and selectively engages the at least one positioning detent (113) in the base (11).

The stationary limiting element (33) is mounted rotatably around the rotating rod (31) and has an edge and a limit (331). The limit (331) is formed on and extends radially out of the edge of the stationary limiting element (33).

The rotating limiting element (34) is mounted securely on the rotating rod (31) and has a contacting surface and at least one stop (341). The contacting surface of the rotating limiting element (34) abuts against the stationary limiting element (33). The at least one stop (341) is formed on the contacting surface of the rotating limiting element (34) and corresponds to and selectively abuts against the limit (331) on the stationary limiting element (33).

The fastening bracket (35) is mounted securely on the top end of the rotating rod (31) and engages the fastening protrusions (314) on the rotating rod (31).

The resilient element (36) is mounted around the rotating rod (31) between the rotating positioning element (32) and the flange (311) on the rotating rod (31).

The washers (37) are mounted around the rotating rod (31) to reduce the friction.

Figure 7:
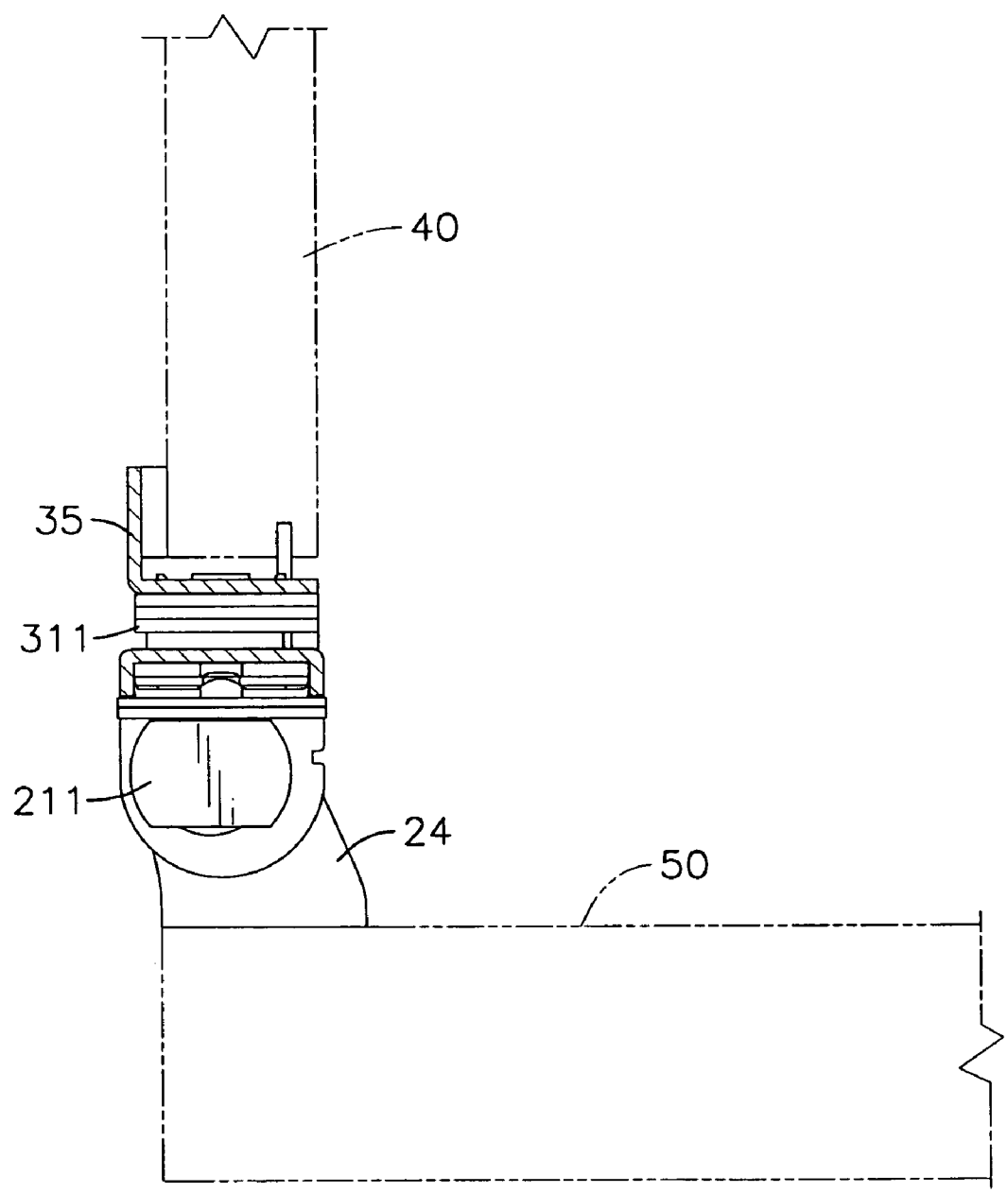
FIG. 7 is an end view in partial section of the hinge in FIG. 1 mounted in an electronic device.
Figure 8:
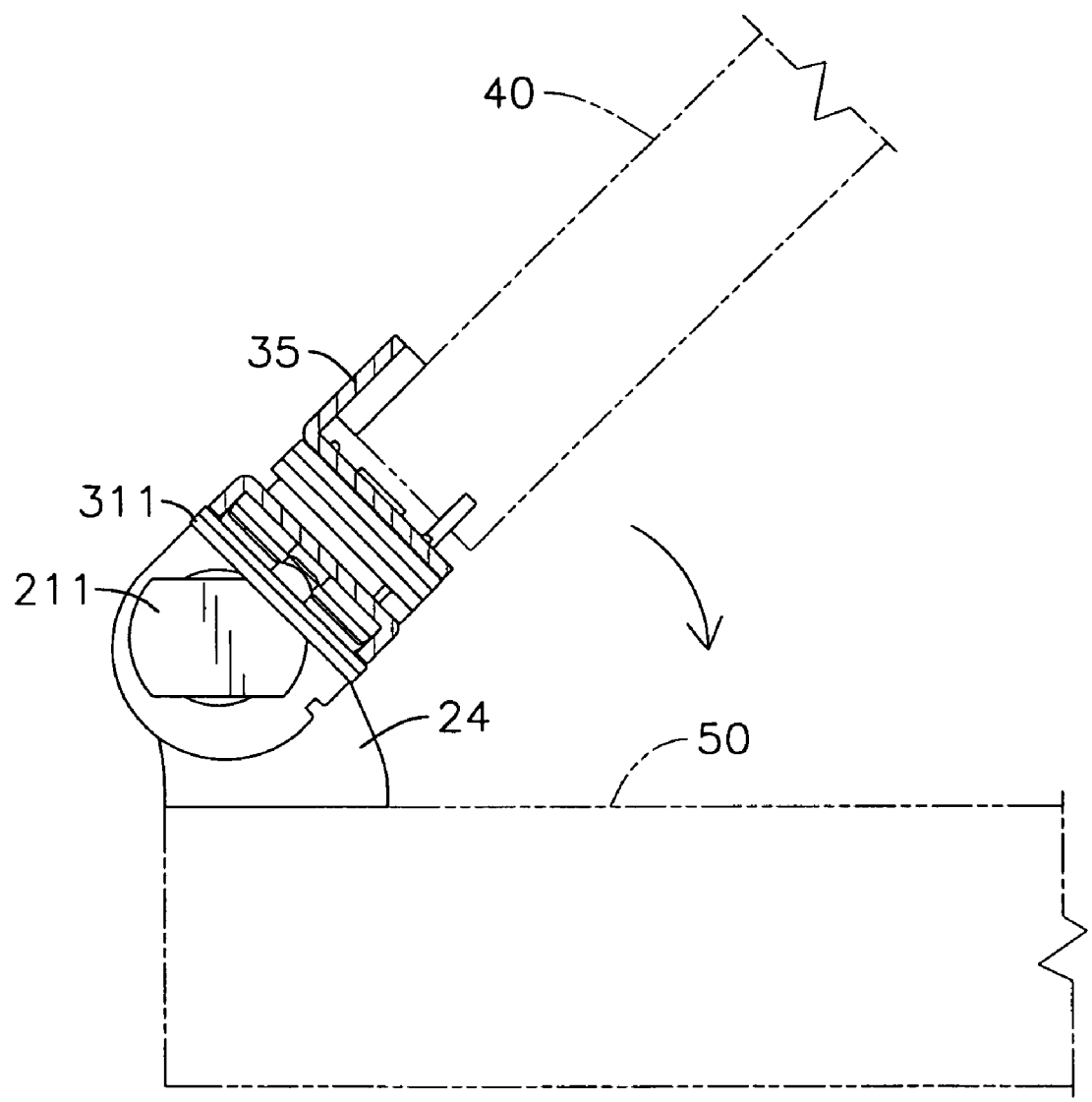
FIG. 8 is an operational end view in partial section of the hinge in FIG. 1 when a panel of the electronic device rotates relative to a base of the electronic device.

With further reference to FIGS. 7 and 8, the hinge in accordance with the present invention is mounted in an electronic device. The electronic device comprises a panel (40) and a base (50). The fastening bracket (35) of the rotating hinge assembly (30) connects to the panel (40). The connecting bracket (24) and the limiting bracket (27) of the tilt hinge assembly (20) connect to the base (50).

Figure 5:
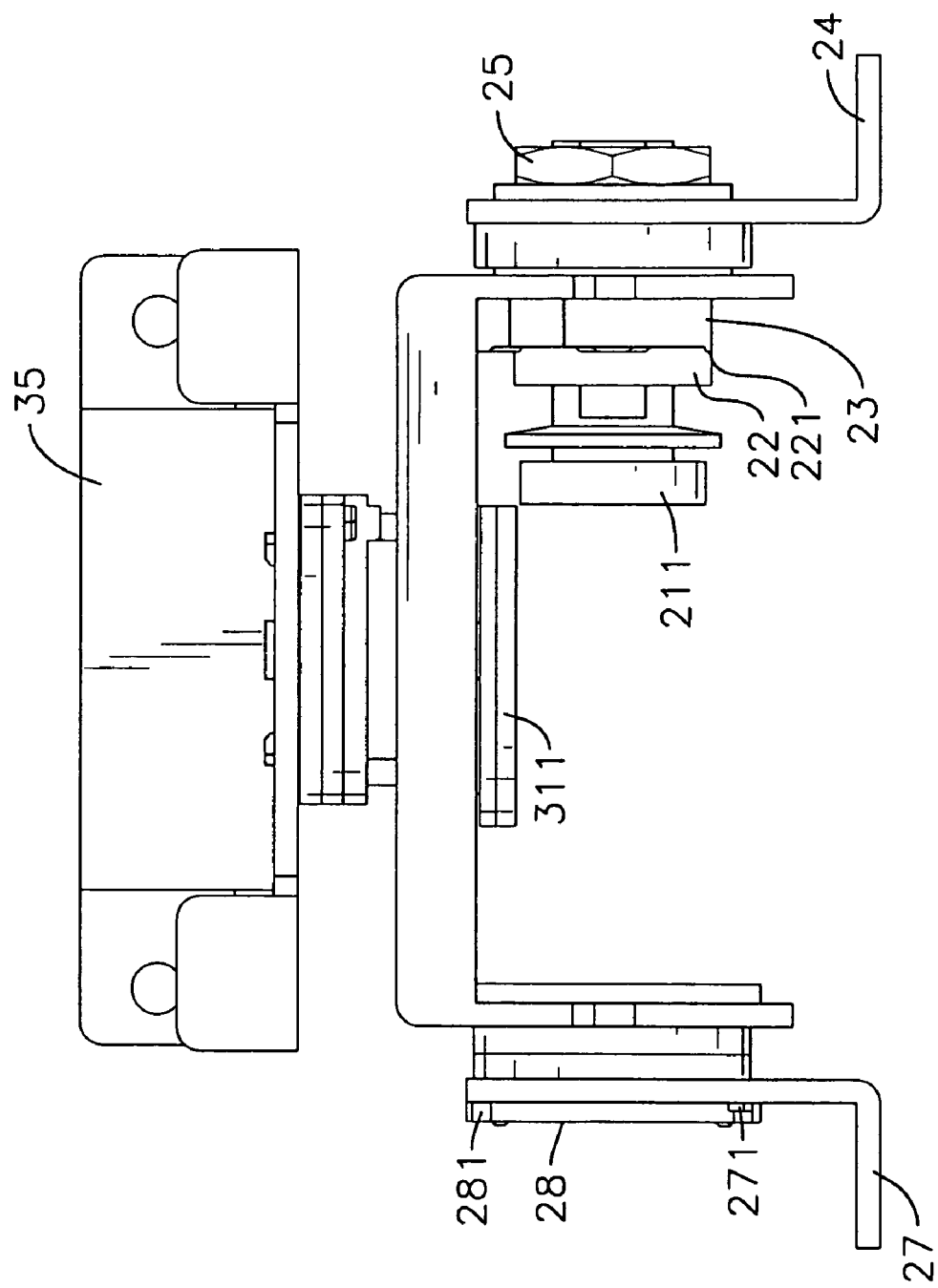
FIG. 5 is a side view of the hinge in FIG. 1.
Figure 6:
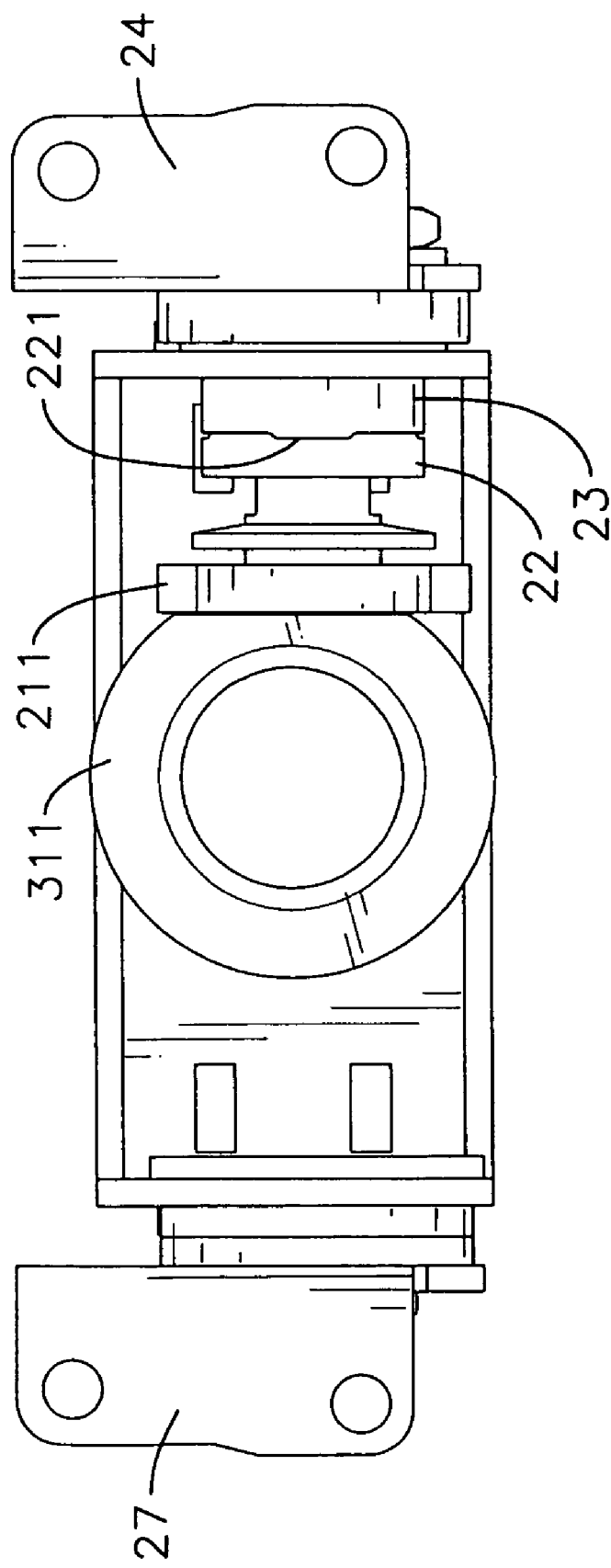
FIG. 6 is a top view of the hinge in FIG. 1.

With further reference to FIGS. 5 and 6, when the panel (40) rotates via rotating hinge assembly (30), the panel (40) rotates relative to the base (50). The panel (40) drives the rotating rod (31) to rotate relative to the base (11) of the central bracket (10). Because the arc side (313) of the flange (311) of the rotating rod (31) abuts against the ribs (112) on the base (11), the ribs (112) support the rotating rod (31) to keep from shaking. Therefore, the panel (40) is kept steady when the panel (40) rotates relative to the base (50).

When the panel (40) rotates via the tilt hinge assembly (20), the panel (40) is opened or closed relative to the base (50). The rotating rod (31) of the rotating hinge assembly (30) is rotated relative to the limiting shaft (21) of the tilt hinge assembly (20). When the inside angle between the panel (40) and the base (50) is smaller than 90 degrees, the arc side (313) of the flange (311) of the rotating rod (31) aligns with the limiting side (212) of the limiting head (211) of the limiting shaft (21). The rotating rod (31) is stopped by the limiting shaft (21). Therefore, the panel (40) cannot rotate via the rotating hinge assembly (30) when the inside angle between the panel (40) and the base (50) is smaller than 90 degrees.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge to improve panel stability comprising:
   a central bracket having
      a base having
         a first end;
         a second end;
         two sides;
         an outer surface;
         an inner surface; and
         two ribs respectively formed perpendicularly on the two sides of the base toward the inner surface of the base;
      a first arm formed perpendicularly on the first end of the base toward the inner surface of the base; and
      a second arm formed perpendicularly on the second end of the base toward the inner surface of the base;
   a tilt hinge assembly connecting to the first and second arms of the central bracket and comprising a limiting shaft extending through the first arm and having
an outer end;
an inner end; and
a limiting head formed transversely on the inner end of the limiting shaft and having two limiting sides opposite to each other and two flat sides opposite to each other, wherein a distance between the limiting sides is longer than a distance between the flat sides;
a connecting bracket mounted securely on the limiting shaft;
a fastener mounted securely on the outer end of the limiting shaft;
a stationary rod mounted securely in and extending through the second arm of the central bracket and having an outer end; and
a limiting bracket mounted rotatably on the outer end of the stationary rod; and
a rotating hinge assembly connecting to the base of the central bracket and comprising
a rotating rod mounted rotatably and extending through the base of the central bracket and having
a bottom end;
a top end; and
a flange formed radially on the bottom end of the rotating rod, abutting against the ribs on the base of the central bracket adapted to improve panel stability with abutment of the flange with the ribs, corresponding to the limiting head of the limiting shaft and having
a flat side alternatively aligning with the limiting side or the flat side of the limiting head of the limiting shaft;
an arc side adjacent to the flat side of the rotating rod abutting against the ribs on the base of the central bracket and alternatively aligning with the limiting side or the flat side of the limiting head of the limiting shaft; and
a center, wherein a distance between the center and the flat side of the rotating rod is shorter than a distance between the center and the arc side; and
a fastening bracket mounted securely on the top end of the rotating rod.

2. The hinge as claimed in claim 1, wherein
the base of the central bracket has
a central hole; and
at least one positioning detent formed in the inner surface of the base around the central hole; and
the rotating hinge assembly further comprises a rotating positioning element mounted securely on the rotating rod, abutting against the inner surface of the base and having
a top surface; and
at least one positioning protrusion formed on the top surface of the rotating positioning element and selectively engaging the at least one positioning detent in the base.

3. The hinge as claimed in claim 2, wherein the tilt hinge assembly further comprises
a rotating positioning element mounted securely on the limiting shaft and having
a contacting surface; and
at least one positioning detent formed in the contacting surface of the rotating positioning element; and
a stationary positioning element mounted around the limiting shaft, mounted securely on the first arm and having
a contacting surface facing to the contacting surface of the rotating positioning element of the tilt hinge assembly;
a fastening surface; and
at least one positioning protrusion formed on and extending out of the contacting surface of the stationary positioning element and corresponding to and selectively engaging the at least one positioning detent in the rotating positioning element of the tilt hinge assembly.

4. The hinge as claimed in claim 3, wherein
the first arm of the central bracket has a fastening hole formed through the first arm; and
the stationary positioning element of the tilt hinge assembly has a fastening protrusion formed on and extending out of the fastening surface of the stationary positioning element and extending through the fastening hole in the first arm.

5. The hinge as claimed in claim 4, wherein
the limiting bracket of the tilt hinge assembly has an outer surface and a stop formed on the outer surface of the limiting bracket; and
the tilt hinge assembly further comprises a limiting element mounted securely on the outer end of the stationary rod, engaging the fastening protrusions on the stationary rod and having
an edge; and
an arc limit formed radially on the edge of the limiting element and selectively abutting against the stop on the limiting bracket.

6. The hinge as claimed in claim 5, wherein the rotating hinge assembly further comprises
a stationary limiting element mounted rotatably around the rotating rod and having
an edge; and
a limit formed on and extending radially out of the edge of the stationary limiting element; and
a rotating limiting element mounted securely on the rotating rod and having
a contacting surface abutting against the stationary limiting element; and
at least one stop formed on the contacting surface of the rotating limiting element and corresponding to and selectively abutting against the limit on the stationary limiting element.

7. The hinge as claimed in claim 6, wherein the tilt hinge assembly further comprises multiple washers mounted around the limiting shaft and the stationary rod.

8. The hinge as claimed in claim 7, wherein
the outer end of the limiting shaft of the tilt hinge assembly is a threaded end; and
the fastener of the tilt hinge assembly is a nut screwed on the outer end of the limiting shaft.

9. The hinge as claimed in claim 8, wherein the rotating hinge assembly further comprises
a resilient element mounted around the rotating rod between the rotating positioning element and the flange on the rotating rod; and
multiple washers mounted around the rotating rod.

* * * * *